US009461701B1

(12) United States Patent
Mitchener

(10) Patent No.: US 9,461,701 B1
(45) Date of Patent: Oct. 4, 2016

(54) FAST TIME ACQUISITION IN A FREQUENCY-HOPPED COMMUNICATIONS LINK

(71) Applicant: Raytheon Company, Waltham, MA (US)

(72) Inventor: Michael S. Mitchener, Worcester, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/817,592

(22) Filed: Aug. 4, 2015

(51) Int. Cl.
   *H04B 1/7156* (2011.01)
   *H04L 12/807* (2013.01)

(52) U.S. Cl.
   CPC ............. *H04B 1/7156* (2013.01); *H04L 47/27* (2013.01)

(58) Field of Classification Search
   CPC .................. H04B 1/7156; H04B 2001/71563; H04B 2001/71566; H04B 1/713; G01S 19/24; H04J 1/065; H04L 47/27
   See application file for complete search history.

(56) References Cited

U.S. PATENT DOCUMENTS

| 6,173,004 B1 * | 1/2001 | Ohashi ................. H04B 1/7156 375/132 |
| 6,466,958 B1 | 10/2002 | Van Wechel et al. |
| 7,349,381 B1 * | 3/2008 | Clark ................... H04B 1/7156 370/350 |
| 7,634,033 B1 | 12/2009 | Giallorenzi et al. |
| 8,391,416 B1 * | 3/2013 | Snodgrass ............... H04J 1/065 375/316 |
| 8,831,065 B2 | 9/2014 | Hulvey |
| 2012/0281730 A1 | 11/2012 | Hulvey |

OTHER PUBLICATIONS

K.H. Torvmark, "Frequency Hopping Systems;" Chipcon Products from Texas Instruments; Application Note AN014, Ref. SWRA077; 7 Pages.
PCT International Search Report and Written Opinion dated Jul. 11, 2016 corresponding to International Application No. PCT/US2016/029423; 11 Pages.

* cited by examiner

*Primary Examiner* — Vineeta Panwalkar
(74) *Attorney, Agent, or Firm* — Daly, Crowley, Mofford & Durkee, LLP

(57) ABSTRACT

Systems and methods to provide fast time acquisition in a frequency-hopped communication link by taking advantage of the fact that a modem receive path has an instantaneous bandwidth that can span multiple discrete frequencies used by the frequency-hopped link. The systems and methods take advantage of the probabilistic frequency locality of time hypotheses to find a set of time hypotheses that can be searched simultaneously.

13 Claims, 8 Drawing Sheets

FAST TIME ACQUISITION IN A FREQUENCY-HOPPED COMMUNICATIONS LINK

BACKGROUND

As is known in the art, frequency-hopping spread spectrum (FHSS) refers to techniques for transmitting radio signals by rapidly switching a carrier signal among many frequency channels, using a pseudorandom sequence known to both transmitter and receiver. It is used as a multiple access method in the frequency-hopping code division multiple access (FH-CDMA) scheme. Frequency-hopping signals are resistant to narrowband interference, difficult to intercept, and can share a frequency band with many types of conventional transmissions with minimal interference.

One of the challenges of frequency-hopping systems is synchronization between a transmitter and a receiver, also referred to as "time acquisition." One known approach is to have a guarantee that the transmitter will utilize a predetermined set of channels in a fixed period of time. The receiver can then synchronize with the transmitter by picking a random channel and listening for a so-called "synchronization hop" (or "sync hop") on that channel. Sync hops, which may be transmitted periodically, comprise known data patterns unlikely to occur within regular data transmitted on the channel.

In existing FHSS systems, time uncertainty may be resolved by selecting a time hypothesis, calculating the frequency that would be in use at that time, and then dwelling at that frequency for some interval while searching a sync hop. This process can take ten seconds or even longer.

SUMMARY

Described herein are illustrative embodiments to provide fast time acquisition in a frequency-hopped communication link. Illustrative embodiments of the invention can improve acquisition time by an order of magnitude compared to existing implementations. Embodiments take advantage of the fact that a modem receive path has an instantaneous bandwidth that can span multiple discrete frequencies used by the frequency-hopped link (i.e., multiple "hop frequencies"). Given a relatively large time uncertainty, there can be many time hypotheses for which resulting occupied frequencies fall within the instantiation bandwidth of the modem. Illustrative embodiments take advantage of the probabilistic frequency locality of time hypotheses. Rather than predicting a time hypothesis and searching for the known pattern at a single frequency, an illustrative time acquisition process finds a set of time hypotheses that can be searched simultaneously. The processing described herein can be implemented in a radio receiver to reduce acquisition time in a frequency-hopped communication link.

In accordance with one aspect of the invention, a radio frequency (RF) receiver system comprises a clock, a receiver front end operable to receive an RF signals centered around a dwell frequency and to generate a corresponding baseband signal, a baseband signal processor configured to receive the baseband signal and to detect synchronization hops at a plurality of frequency offsets, and a controller. The controller may be configured to: determine a plurality of search windows, each search window associated with a time offset; determine a search start time; determine hop frequencies for one or more of the search windows using a current time reading from the clock, the associated search window time offsets, and a frequency hopping algorithm; select one or more search windows for which the corresponding hop frequencies fit within a receiver front end's instantaneous bandwidth; set the receiver front end dwell frequency based upon the hop frequencies corresponding to the selected search windows; configure the baseband signal processor with frequency offsets corresponding to the selected search windows; and if the baseband signal processor detects a synchronization hop at a given frequency offset, synchronize the clock using at least the corresponding search window time offset.

In some embodiments, the controller is configured to, if the baseband signal processor detects a synchronization hop at a given frequency offset, synchronize the clock using the corresponding search window time offset and an offset from the start of the search window.

In various embodiments, the clock has a time uncertainty and the controller is configured to divide the time uncertainty into the plurality of search windows of equal duration. The search window duration may be an integral multiple of the time at which the sync hop schedule repeats.

In certain embodiments, the controller is configured to select a largest set of search windows for which the corresponding hop frequencies fit within the receiver front end's instantaneous bandwidth. In some embodiments, the controller is further configured to detect and verify synchronization hops. In various embodiments, the controller is further configured to set the receiver front end dwell frequency such that the receiver front end instantaneous bandwidth spans the hop frequencies corresponding to the selected search windows.

According to another aspect of the invention, a method for use within a radio frequency (RF) receive system comprises: (a) determining a plurality of search windows, each search window associated with a time offset; (b) determining a search start time; (c) determining hop frequencies for one or more of the search windows using the search start time, the associated search window time offsets, and a frequency hopping algorithm; (d) selecting one or more search windows for which the corresponding hop frequencies fit within the receive system's instantaneous bandwidth; (e) configuring the receive system to dwell upon the hop frequencies corresponding to the selected search windows; (f) configuring the receive system to process frequency offsets corresponding to the selected search windows; and (g) if the baseband signal processor detects a synchronization hop at a given frequency offset, determining the time difference between the receive system and a transmit system.

In some embodiments, initializing a plurality of search windows comprises assigning each of the search windows to have an open status. The method may further comprise (i) if the baseband signal processor detects no synchronization hop at a given frequency offset, assigning the corresponding search window to have a closed status. The steps (d)-(i) may be repeated at least once.

In various embodiments, initializing a plurality of search windows comprises dividing the time uncertainty into the plurality of search windows of equal duration. The total of the search window durations is at least equal to the time uncertainty.

In some embodiments, selecting one or more search windows for which the corresponding hop frequencies fit within the receiver front end's instantaneous bandwidth comprises selecting the largest set of search windows for which the corresponding hop frequencies fit within the receiver front end's instantaneous bandwidth comprises. In certain embodiments, the method further comprises detecting and verifying synchronization hops.

In various embodiments of the method, setting the receiver front end dwell frequency based upon the hop frequencies corresponding to the selected search windows comprises setting the receiver front end dwell frequency as the center of the hop frequencies corresponding to the selected search windows.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Figure 1:
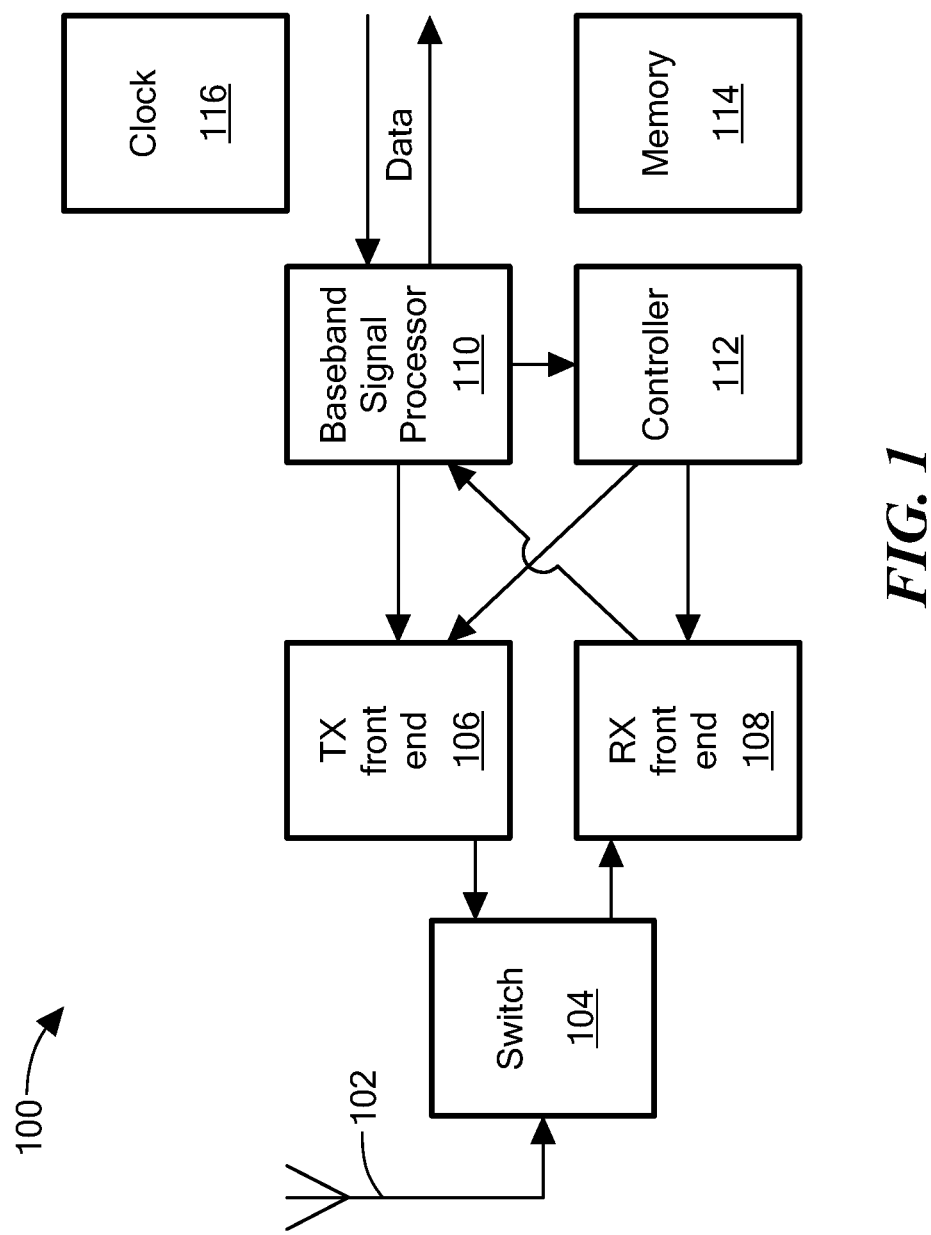
FIG. 1 is a block diagram showing an illustrative radio frequency (RF) transmit-receive system.

Referring to FIG. 1, an illustrative radio frequency (RF) transmit-receive system 100 may be used to establish a frequency-hopped communications link. The system 100 may include an antenna 102, a switch 104, a transmitter front end 106, a receiver front end 108, a baseband signal processor 110, a controller 112, memory 114, and a clock 116. The switch 104 may comprise any suitable combination of hardware (e.g., circuitry) and/or software that enables the antenna 102 to be used for both transmitting RF signals into free space (via transmitter front end 106) and receiving RF signals from free space (via the receiver front end 108).

Figure 1A:
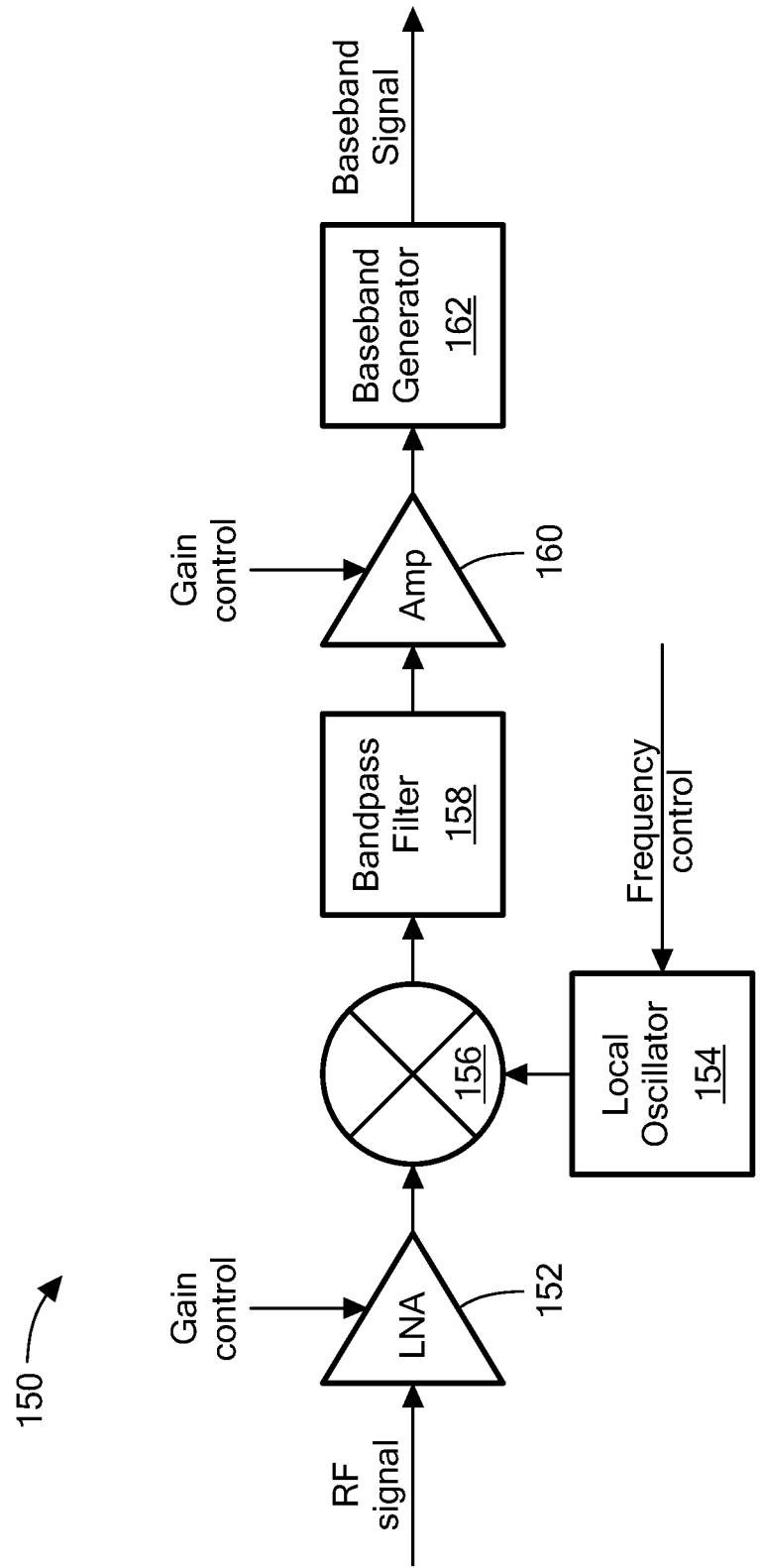
FIG. 1A is a block diagram showing an illustrative receiver front end.

The transmitter front end 106 may comprise any suitable combination of hardware and/or software configured to up-convert a baseband signal to an RF signal. The receiver front end 108 may comprise any suitable combination of hardware and/or software configured to down-convert an RF signal to a baseband signal. An illustrative embodiment of a receiver front end 108 is shown in FIG. 1A and described below in conjunction therewith.

The baseband signal processor (or "baseband processor") 110 may comprise any suitable combination of hardware and/or software configured to generate a baseband signal for transmission via the transmitter front end 106 and/or to process a baseband signal received via the receiver front end 108. For example, the baseband processor 110 may be configured to convert a digital signal (e.g. a data signal) to an analog baseband signal for transmission via the transmitter front end 106. As another example, the baseband processor 110 may be configured to convert an analog baseband signal received via the receiver front end 108 to a digital signal (e.g. a data signal). Any suitable analog-to-digital and digital-to-analog techniques may be used. In some embodiments, the baseband processor 110 is a digital baseband signal processor and thus analog-to-digital conversion may occur within the receiver front end 108 and/or digital-to-analog conversion may occur within the transmitter front end 106.

The controller 112 may comprise any suitable combination of hardware and/or software configured to control the operation of the transmitter front end 106 and/or receiver front end 108. For example, the controller 112 may be utilized to select a specific frequency for a local oscillator, or a specific gain for a variable gain amplifier. To provide frequency-hopped communications, the controller 112 can control the RF frequency bands in which the front ends 106, 108 operate during specific time periods. The controller 112 may utilize programmable parameters, such as parameters used to calculate specific frequencies and gain values. The controller parameters may be stored within memory 114, which can be provided as EPROM, DRAM, NVRAM, or any other suitable type of memory. In various embodiments, the controller 112 implements a time acquisition process, such as the illustrative process 300 shown in FIG. 3.

In some embodiments, the baseband processor 110 and controller 112 are provided within a common processing device, such as a computer, an application specific integrated circuit (ASIC), or analog circuitry.

The clock 116 may comprise any suitable combination of hardware and/or software operable to keep and indicate time with suitable accuracy.

The system 100 may operate a full-duplex transceiver, whereby the transmitter front end 106 is used to transmit on a first set of frequencies and the receiver front end 108 is used to receive on a second, possibly different, set of frequencies.

In one mode of operation, the illustrative system 100 can receive data transmitted over a frequency-hopped communication link. Associated with the link is a hopping sequence that specifies which frequencies/channels are to be used for transmitting and receiving at given times. Although a static hopping sequence can be defined, in many embodiments a frequency-hopping algorithm (e.g., a pseudo-random algorithm) is used to determine the transmit/receive frequency for a given time.

The receiver clock 116 has a time uncertainty relative to a clock used by the transmitter. The time uncertainty is a parameter of the transmitter-receiver link and may result from clock drift, location error, ephemeris position error, and/or range error. The initial time uncertainty for a given link can be determined in any suitable manner. In one example, one or more initial time uncertainty values may be determined prior to operation and the system 100 may simply choose a predetermined value to use. The initial time uncertainty may range from tens of milliseconds to tens of seconds.

Figure 3:
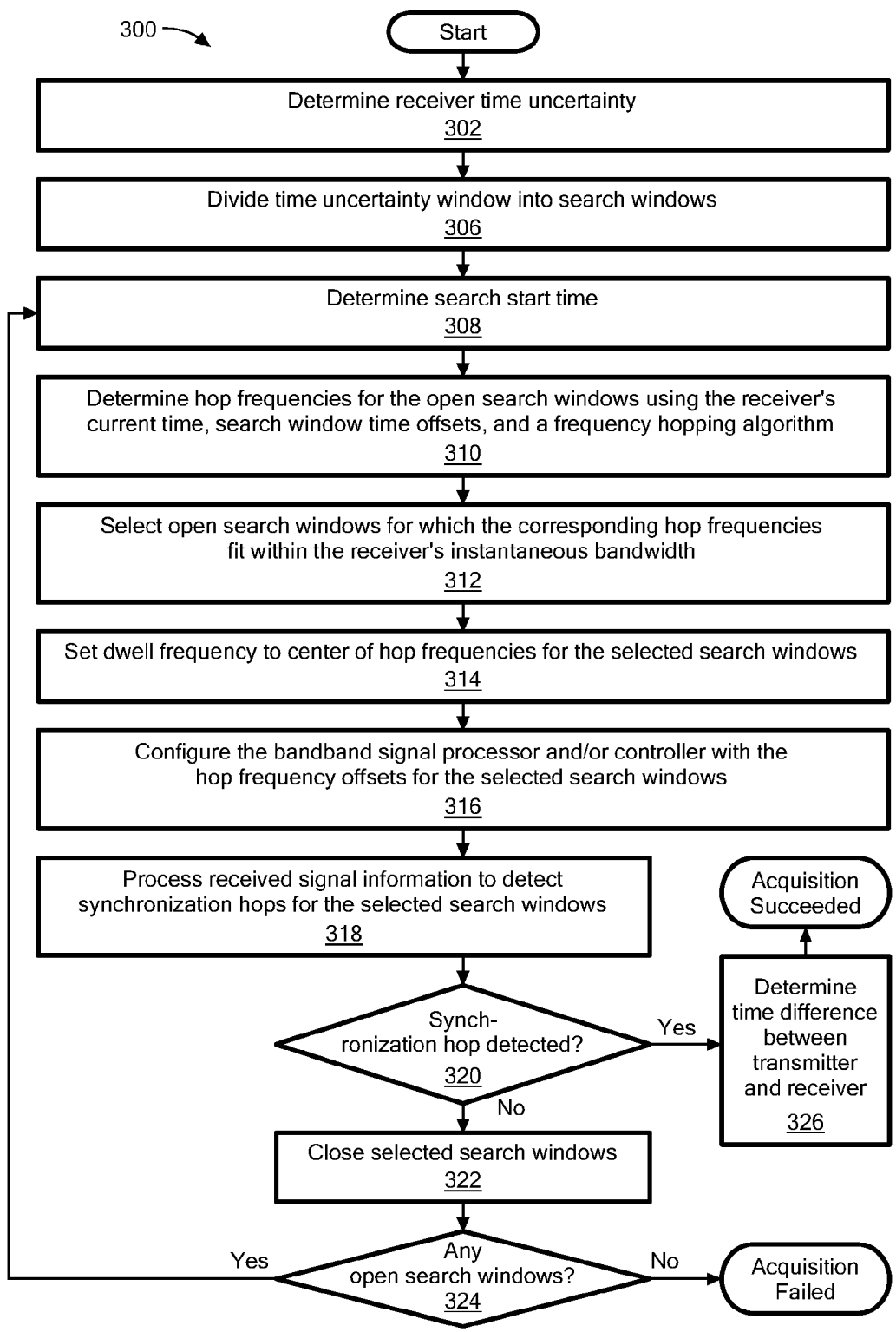
FIG. 3 is a flow diagram showing an illustrative time acquisition process.

To resolve time uncertainty (i.e., to adjust the receiver clock timing to be aligned with the transmitter clock), the receive system 100 can utilize a time acquisition process to determine a time difference between the receiver clock and the transmitter clock. This time difference can then to be used to adjust the clock 116 or otherwise synchronize the receive system 100 with the transmitter. Once synchronized, the receive system 100 can successfully follow the hopping sequence to receive data. An example of a time acquisition processing is shown in FIG. 3 and described below in conjunction therewith.

Referring to FIG. 1A, an illustrative receiver front end 150 may correspond to the receiver front end 108 of FIG. 1. The receiver front end 150 may include a first amplifier 152 and a local oscillator 154 coupled to inputs of a mixer 156, a bandpass filter 158 coupled to an output of the mixer 156, a second amplifier 160 coupled to an output of the bandpass filter 158, and a baseband signal generator (or "baseband generator") 162 coupled to an output of the amplifier 160.

The first amplifier 152 may be coupled to receive RF signals from an antenna (e.g., antenna 102 of FIG. 1) and the baseband generator 162 may be coupled to provide baseband signals to a baseband processor (e.g., baseband processor 110 of FIG. 1).

The first amplifier 152 may comprise any suitable type of amplifier for receiving an RF signal (e.g., from antenna 102 of FIG. 1) and generating a corresponding amplified RF signal. In some embodiments, the first amplifier 152 is a low-noise amplifier (LNA).

The local oscillator 154 may comprise any suitable combination of hardware (e.g., circuitry) and/or software to generate a signal having a frequency either preset or variable under external control. In various embodiments, a controller (e.g., controller 112 of FIG. 1) controls the oscillator frequency via a frequency control signal or other means. In some embodiments, the local oscillator 154 is a voltage-controlled oscillator (VCO) and the frequency control signal is a voltage signal.

The mixer 156 may comprise any suitable combination of hardware (e.g., circuitry) and/or software to receive two input signals and to generate an output signal representing a difference or sum of the frequencies of the two input signals. In the arrangement shown, a first mixer input signal corresponds to the first amplifier 152 output signal (the "amplified RF signal"), and the second mixer input signal corresponds to the local oscillator 154 output signal. It will be appreciated that the local oscillator 154 and mixer 156 can be used in combination to convert the RF signal to an intermediate frequency (IF) signal having a desired frequency.

The bandpass filter 158 may comprise any suitable combination of hardware and/or software to selectively pass signals within a certain bandwidth (e.g., a bandwidth centered about the IF) while attenuating signals outside that bandwidth. Thus, for example, a conventional bandpass circuit could be used.

The second amplifier 160 may comprise any suitable type of amplifier for receiving an IF signal from bandpass filter 158 and generating an amplified IF signal. In some embodiments, first amplifier 152 and/or second amplifier 160 comprise variable gain amplifiers. For example, the amplifiers 152, 160 could receive respective gain control signals (or otherwise be controlled by) the controller 112 of FIG. 1.

The baseband generator 162 may comprise any suitable combination of hardware and/or software to convert the (analog) IF signal to a baseband signal suitable for processing by a baseband signal processor (e.g., baseband processor 110 of FIG. 1). In some embodiments, the baseband generator 162 comprises a mixer and local oscillator (not shown) to down-convert the IF signal to a baseband signal. In certain embodiments, the baseband signal processor 110 takes a digital input signal and, thus, the baseband generator 162 includes an analog to digital converter (ADC) to digitize the analog IF signal. In other embodiments, the baseband signal processor 110 takes an analog signal as input and performs analog to digital conversion.

FIGS. 2, 2A-2C, and 3 illustrate a time acquisition process that can be used within a receive system or a transmit-receive system, such as the system 100 of FIG. 1. The illustrative time acquisition processing disclosed herein can search multiple time hypotheses at once by taking advantage of the fact that the instantaneous bandwidth in a receiver may span multiple hop frequencies. As a result, a receive system utilizing the illustrative time acquisition process can synchronize with a transmitter faster compared to existing systems.

Figure 2:
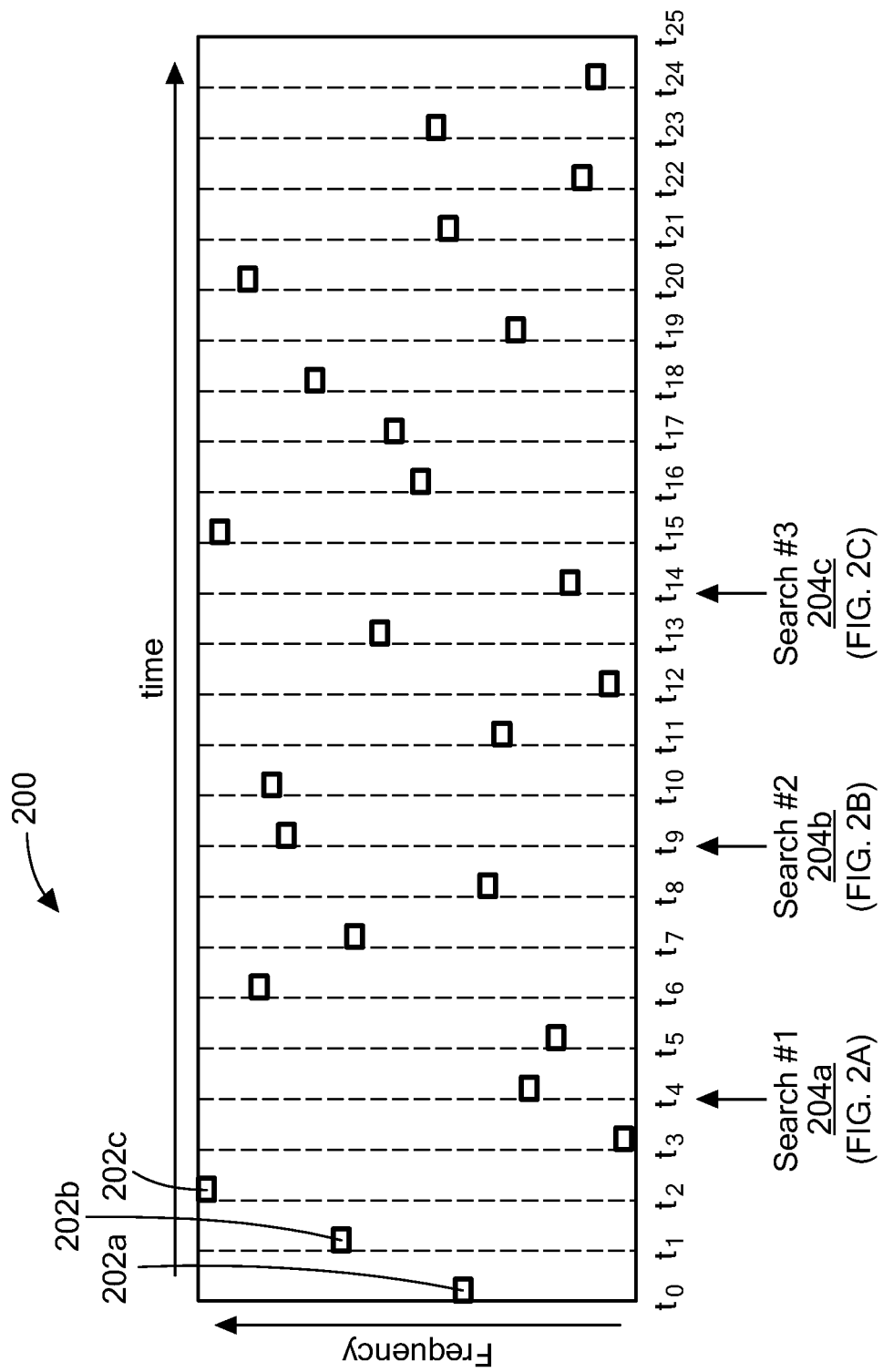
FIGS. 2 and 2A-2C are timing diagrams showing an illustrative time acquisition process.

Referring to FIG. 2, a timing diagram 200 shows periodic sync hops 202a, 202b, 202c, . . . (generally denoted 202) transmitted over a frequency hopped communication link. Each sync hop 202a, 202b, 202c, . . . is transmitted at a respective time $t_0$, $t_1$, $t_2$, . . . , and on a respective frequency determined by an aperiodic hopping sequence (e.g., a pseudo-random algorithm). The transmitter sends sync hops 202 for short durations, interspersed with regular data. A sync hop 202 includes special symbols or other information that is distinguishable from regular data. It should be appreciated that the duration of time during which sync hops 202 are transmitted is typically only a few percent of that during which regular data is transmitted (thus, FIG. 2 does not accurately depict sync hop durations).

In the example, shown, sync hops 202 are sent at regular intervals $t_0$, $t_1$, $t_2$, . . . . In general, the times between successive sync hops 202 can vary. The timing of the hops 202 follows a pattern that repeats over some period. In some embodiments, the repeating pattern is specified by a bitmap that can be programmed into the transmitter and receiver.

The times $t_0$, $t_1$, $t_2$, . . . at which sync hops 202 are to be transmitted are relative to some clock used by the transmitter, referred to herein as the transmitter's "local" clock. The receiver uses a different local clock, which has a time uncertainty relative to the transmitter's local clock. A goal of the time acquisition process is to determine the time difference between the transmitter's local clock and the receiver's local clock. The general approach is to compare the times at which particular sync hops 202 are actually detected by the receiver against the times at which those sync hops are known to be transmitted (accounting for propagation delays, processing delays, and other factors as needed).

The receiver's time uncertainty (herein denoted $T_\epsilon$), corresponds to the maximum time difference (+/−) between the receiver's local clock and the transmitter's local clock. In other words, at any instant the receiver's local clock is assumed to be no more than $T_\epsilon$ time units behind, and no more than $T_\epsilon$ time units ahead of, the transmitter's local clock. The range $[-T_\epsilon, +T_\epsilon]$ is referred to herein as the "time uncertainty window." The receiver's time uncertainty ($T_\epsilon$) may be determined prior to operation using any suitable technique and stored (or otherwise configured) within the receiver.

Knowing the time uncertainty ($T_\epsilon$), the frequency hopping sequence (e.g., the pseudorandom algorithm), and the times at which the sync hops 220 are transmitted, a receiver can resolve its time uncertainty by detecting sync hops at specific frequencies. The overall time acquisition process may include one or more so-called "searches." The time uncertainty window is divided into a plurality of "search windows," generally of equal size. The duration of a search window is typically an integer multiple (>=1) of the time between successive sync hops 202 so that, during each search, there is a possibility of detecting a sync hop. In practice, it may be necessary to choose a larger search window size to account for filtering and other signal processing delays. For simplicity of explanation, in FIGS. 2 and 2A-2C, the duration of each search window is assumed to be the same as the duration between any two successive sync hops 202.

During each search, multiple time hypotheses can be tested. As used herein, the term "time hypothesis" refers to a possible time difference between the receiver's local clock and the transmitter's local clock that can be proved true or false. If a time hypothesis proves true, the corresponding time difference can be used to synchronize the receiver with the transmitter. The process can be repeated until a time hypothesis proves true, or until all time hypotheses prove false. In some embodiments, a time hypothesis may be verified using a suitable validation technique as discussed below in conjunction with FIG. 3.

In FIG. 2, three successive searches 204a, 204b, and 204c (generally denoted 204) are illustrated. Each search 204 attempts to detect sync hops 202 within a time period defined by the time uncertainty window centered around a search start time (where the search start time is measured using the receiver's local clock). In the example shown, the time uncertainty is assumed to be +/−4 time units. Search 204a commences at time $t_4$ and attempts to detect sync hops from $t_0$ to $t_8$. Search 204b commences at $t_9$ and attempts to detect sync hops from $t_5$ to $t_{13}$. Search 204c commences at $t_{14}$ and attempts to detect sync hops from $t_{10}$ to $t_{18}$.

Figure 2A:
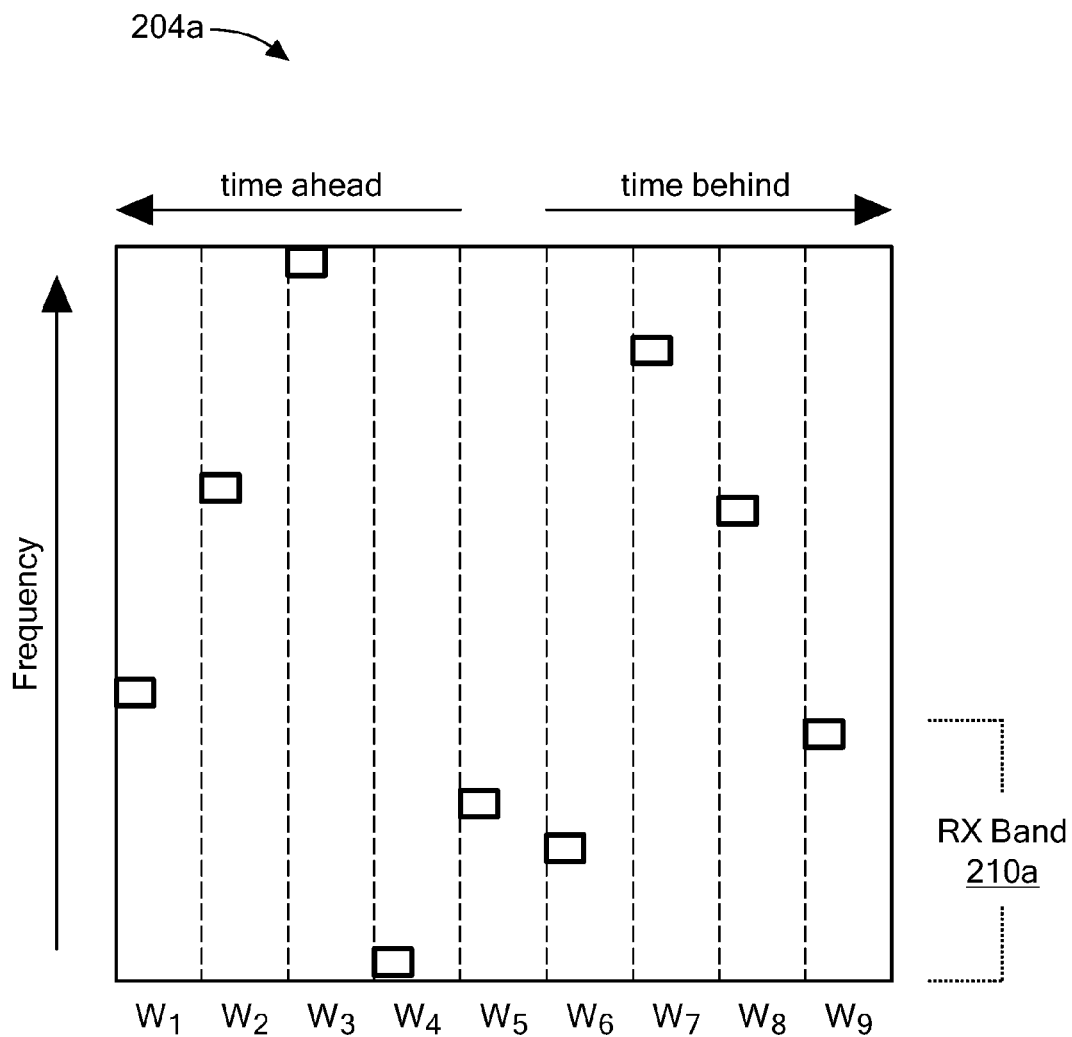
Figure 2B:
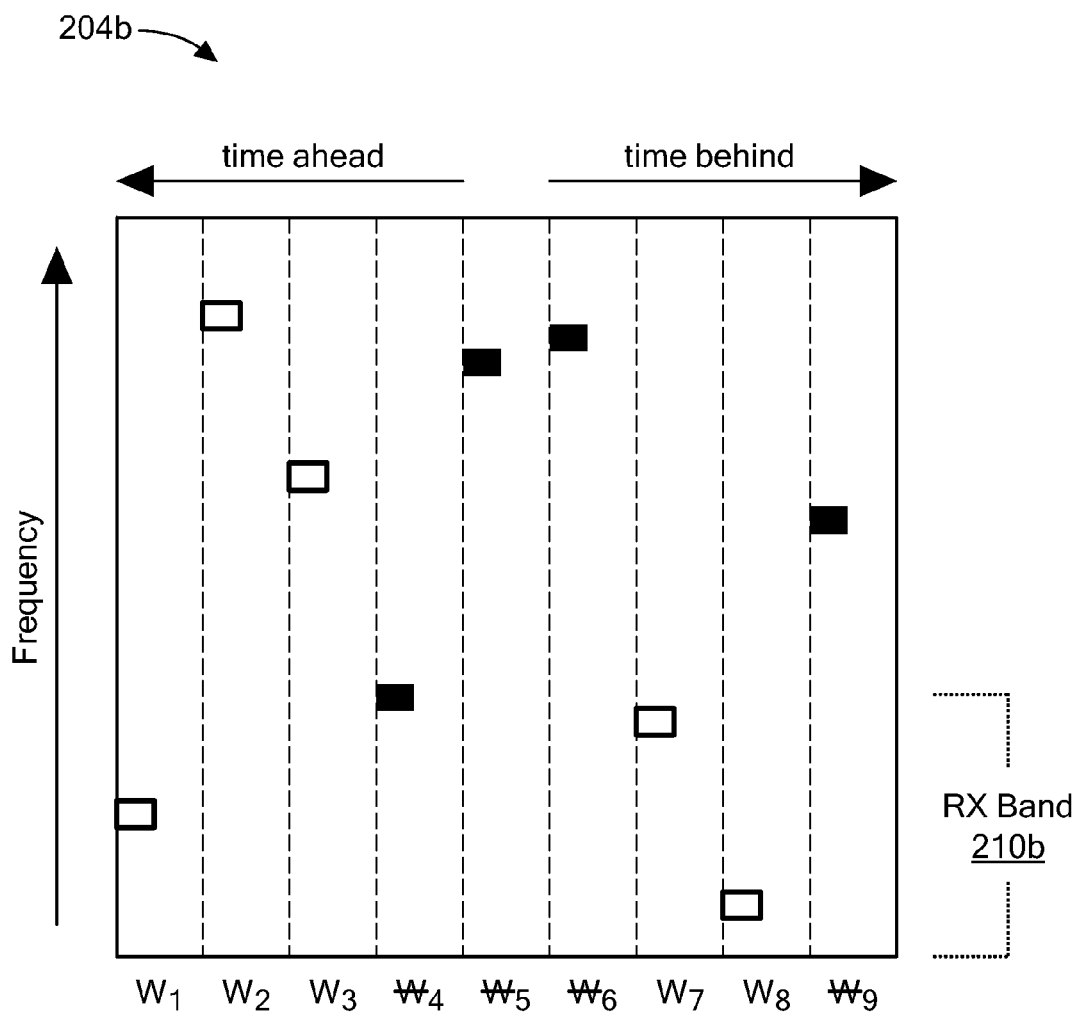
Figure 2C:
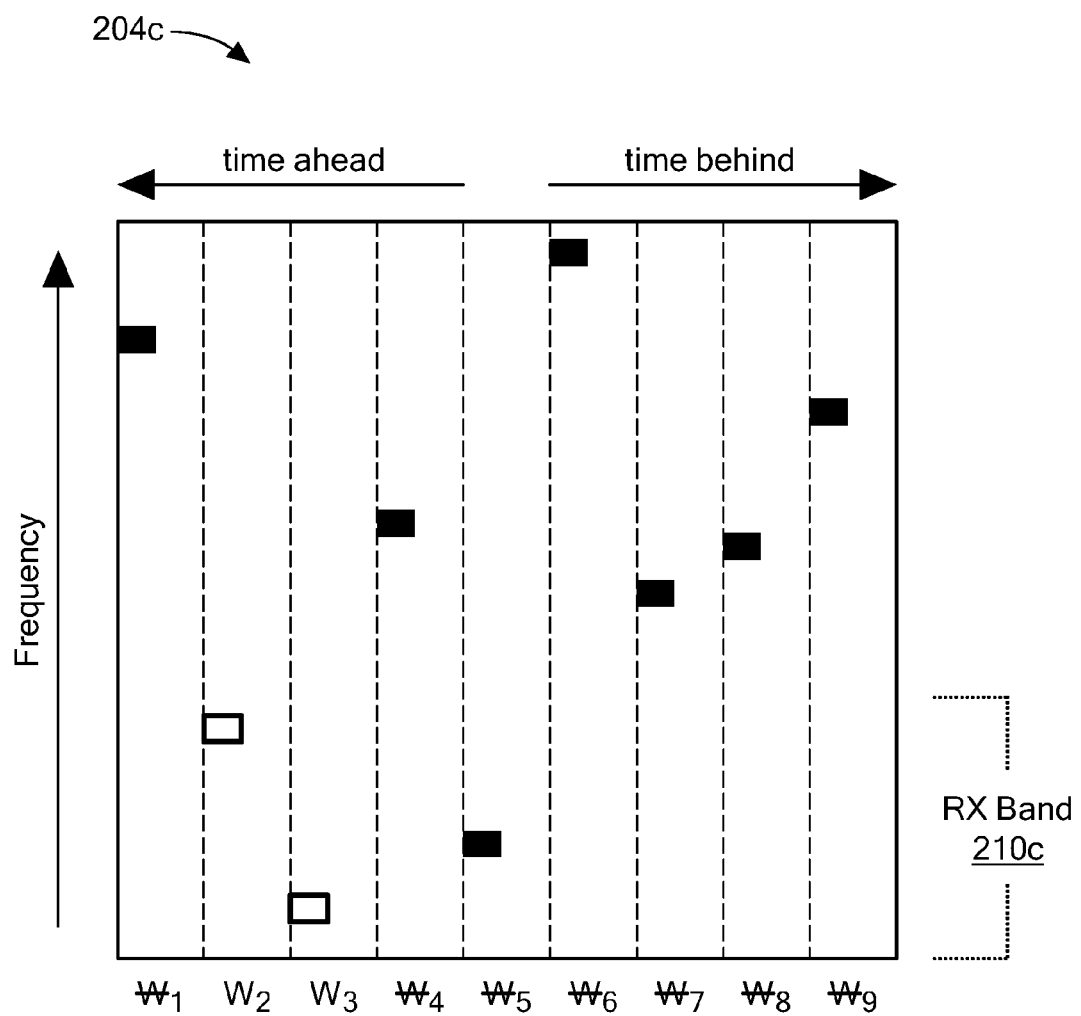

FIGS. 2A, 2B, and 2C illustrate searches 204a, 204b, and 204c, respectively. Each search is divided into nine (9) search windows denoted $w_1 \ldots w_9$. It should be appreciated that the pattern of sync hops 202 shown in FIG. 2 is repeated, in part, in FIGS. 2A-2C. For example, sync hop 202a of FIG. 2 corresponds to the sync hop in search window $w_1$ of FIG. 2A.

The receiver front end has a maximum bandwidth within which it can receive and process RF signals, referred to herein as its instantaneous bandwidth. As is known, a receiver's instantaneous bandwidth is determined by the frequency responses of its various components, including the low-noise amplifier, mixer, bandpass filter, baseband generator, etc. Thus, the instantaneous bandwidth can be measured or otherwise determined for a given receiver design. The receiver's instantaneous bandwidth is typically less than bandwidth over which frequency hopping can occur, but is typically large enough such that the receiver can search multiple hop frequencies simultaneously. For example, in FIGS. 2A, 2B, and 2C, the receiver's instantaneous bandwidth may be large enough to overlap five adjacent hop frequencies, as shown by bands 210a, 210b, and 210c, respectively.

Although three searches 204a-204c are shown in FIG. 2, it should be understood that the actual number of searches performed varies according to the generalized process described below in conjunction with FIG. 3.

Referring to FIG. 2A, search 204a commences at time $t_4$ and attempts to detect sync hops from $t_0$ to $t_8$. No time hypotheses have yet been tested and, thus, all nine search windows $w_1 \ldots w_9$ are considered to be "open." Using the frequency hopping sequence shown in FIG. 2 and the search start time ($t_4$), the frequency of each open search window's sync hop can calculated. For example, for search window $w_1$, the sync hop frequency corresponds to that shown at $t_4-4=t_0$ in FIG. 2. As another example, for search window $w_5$, the sync hop frequency corresponds to that shown at $t_4-0=t_4$ in FIG. 2. As yet another example, for search window $w_9$, the sync hop frequency corresponds to that shown at $t_4+4=t_8$ in FIG. 2.

Using the calculated hop frequencies for each of the open search windows, one or more of the search windows are selected for which corresponding hop frequencies fit within the receiver's instantaneous bandwidth. One strategy (which is illustrated in FIGS. 2A-2C) is to position the band 210a such it spans the largest set of open search windows possible based on the receiver's instantaneous bandwidth.

At the start of search 204a, the largest set of open search windows that can be searched simultaneously is $\{w_4, w_5, w_6, w_9\}$. From this set, a center frequency can be calculated and used to configure the receiver front end dwell frequency, resulting in the instantaneous band 210a shown. The receiver can then dwell at this center frequency and process signal data to detect sync hops at any of the hop frequencies corresponding to the selected search windows.

If a sync hop is detected for a given search window, the time difference between the receiver's local clock and the transmitter's local clock can be determined. For example, in FIG. 2A, if the sync hop corresponding to search window $w_1$ were detected, the transmitter's local time is known to be between $t_0$ and $t_1$. Because search 204a commenced at time $t_4$, the receiver is known to be 4 to 5 time units ahead of the transmitter and the time uncertainty can be narrowed accordingly. In various embodiments, the receiver samples received signal data many times per search window. The smallest increment of time at which the data is sampled is referred to as a "time cell." For example, a search window may be on the order of milliseconds, where a time cell may be on the order of a couple microseconds. When a time cell is detected, the time hypothesis can be expressed as a number of time cells from the start of the search window. Knowing the receiver's current time, the time offset from the start of the search window, and time hypothesis of the sync hop detection, the time difference between the receiver system and the transmitter can be determined on the order of microseconds.

If no sync hops are detected for a search, additional searches 204 may be performed. In this example, it is assumed that no sync hops are detected for search windows $w_4, w_5, w_6, w_9$. Accordingly, the corresponding time hypotheses are proved false and the search windows can be marked as "closed." It should be appreciated that, whereas existing time acquisition techniques test a single time hypothesis at a time, the illustrative processing disclosed herein can test multiple time hypotheses simultaneously, thereby reducing the time amount of time required for a receiver to synchronize on a frequency-hopped communication link.

The next search can begin as soon as the first search completes. For simplicity of explanation and to promote clarity within the drawings, the searches 204a-204c commence exactly five (5) time units apart. In practice, the difference between successive search start times may be more or less than five (5) time units.

Referring to FIG. 2B, search 204b begins with search windows $w_4, w_5, w_6, w_9$ closed and search windows $w_1, w_2, w_3, w_7$, and $w_8$ open. Using the frequency hopping sequence shown in FIG. 2 and the search start time ($t_9$), the frequency of each open search window's sync hop can calculated. For completeness, the closed search windows and corresponding sync hops are also shown in FIG. 2B, but are shown with strikethroughs and solid fill, however these sync hops are not considered during search 204b. Of the open search windows, the set $\{w_1, w_7, w_8\}$ corresponds to a largest set for which corresponding hop frequencies fit within the receiver's instantaneous bandwidth. The receiver can be configured dwell at the center of band 210b to detect sync hops. If no hops are detected, search windows $w_1, w_7$, and $w_8$ may also be closed.

Referring to FIG. 2C, search 204c begins at time $t_{14}$ with search windows $w_1, w_4, w_5, w_6, w_7, w_8$, and $w_9$ closed and search windows $w_2, w_3$ open. Of the open search windows, the set $\{w_2, w_3\}$ corresponds to the largest set for which corresponding hop frequencies fit within the receiver's instantaneous bandwidth. The receiver can be configured dwell at the center of band 210c to detect sync hops. Because the largest set of open search windows that can be searched (i.e., $\{w_2, w_3\}$) happens to be equal to the set of all open search windows, a frequency hop would typically be detected in this iteration of the search process and no additional searches would be required. In practice, more than three searches may be required to close all search windows (i.e., to test all possible time hypotheses across the time uncertainty window).

In some embodiments, the receiver searches the entire time uncertainty window, and then selects the detection that had the highest confidence, rather than stopping at a successful detection.

FIG. 3 is a flow diagram showing illustrative processing that can be implemented within a receive system, such as system 100 of FIG. 1. Rectangular elements (typified by element 302), herein denoted "processing blocks," represent computer software instructions or groups of instructions. Diamond shaped elements (typified by element 320), herein denoted "decision blocks," represent computer software instructions, or groups of instructions, which affect the execution of the computer software instructions represented by the processing blocks. Alternatively, the processing and decision blocks may represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 3, a time acquisition process 300 begins at block 302, where a receiver's time uncertainty ($T_e$) is determined. At block 306, the time uncertainty window (i.e., $[-T_e, +T_e]$) is divided into multiple search windows, which may be of equal size. At block 308, a search start time is determined. This may include determining the next time the periodic sync hop pattern aligns with the start of a search window. At block 310, sync hops are determined for each open search window, which initially includes all search windows. Block 310 may include using the receiver's current time, the time offset for each open search window, and the frequency hopping algorithm.

At block 312, one or more of the search windows are selected for which corresponding hop frequencies (as determined at block 310) fit within the receiver's instantaneous bandwidth. In some embodiments, this includes finding the largest set of open search windows for which the corresponding sync hop frequencies fit within the receiver's instantaneous bandwidth.

At block 314, a receiver front end (e.g., front end 108 in FIG. 1) may be configured to set the dwell frequency. This may include tuning a local oscillator (e.g., local oscillator 154 in FIG. 1). In some embodiments, the dwell frequency is chosen to be the center of the hop frequencies for the selected search windows (i.e., the search windows selected at block 312).

At block 316, a processor (e.g., controller 112 and/or baseband signal processor 110 in FIG. 1) may be configured with the hop frequencies for the selected search windows.

In some embodiments, the hop frequencies are configured as offset values relative to the configured dwell frequency.

At block 318, the receiver dwells at the configured frequency to collect signal data and detect sync hops. This may include processing baseband signal information from the receiver front end 108 using the configured hop frequencies and correlating the processed information with the known sync hop schedule.

If, at block 320, a sync hop is detected (and possibly verified) for any of the selected search windows, a time difference between the receiver's local clock and the transmitter's local clock can be determined (block 326). In this case, the time acquisition process is terminated successfully. The time difference can be used to adjust the receiver's local clock (e.g., clock 116 in FIG. 1) or otherwise synchronize the receiver and transmitter. In some embodiments, the receiver searches the entire time uncertainty window, and then selects the detection that had the highest confidence, rather than stopping at a successful detection. If a sync hop is detected, the detection may be verified by repeated testing. Likewise, non-detections may be verified by repeated testing.

If, at block 320, no sync hop is detected for any of the selected search windows, processing may proceed to block 322 where the selected search windows are marked as closed.

If, at block 324, any search windows remain open, another search may be performed. Otherwise, if all search windows are closed, the time acquisition process may terminate unsuccessfully.

It will be appreciated that, whereas existing FHSS receivers perform time acquisition in a serial manner, the illustrative systems and processes disclosed herein take advantage of the relatively large instantaneous bandwidth of the receive path to search many time hypothesis at once. This can reduce time acquisition by an order of magnitude.

Figure 4:
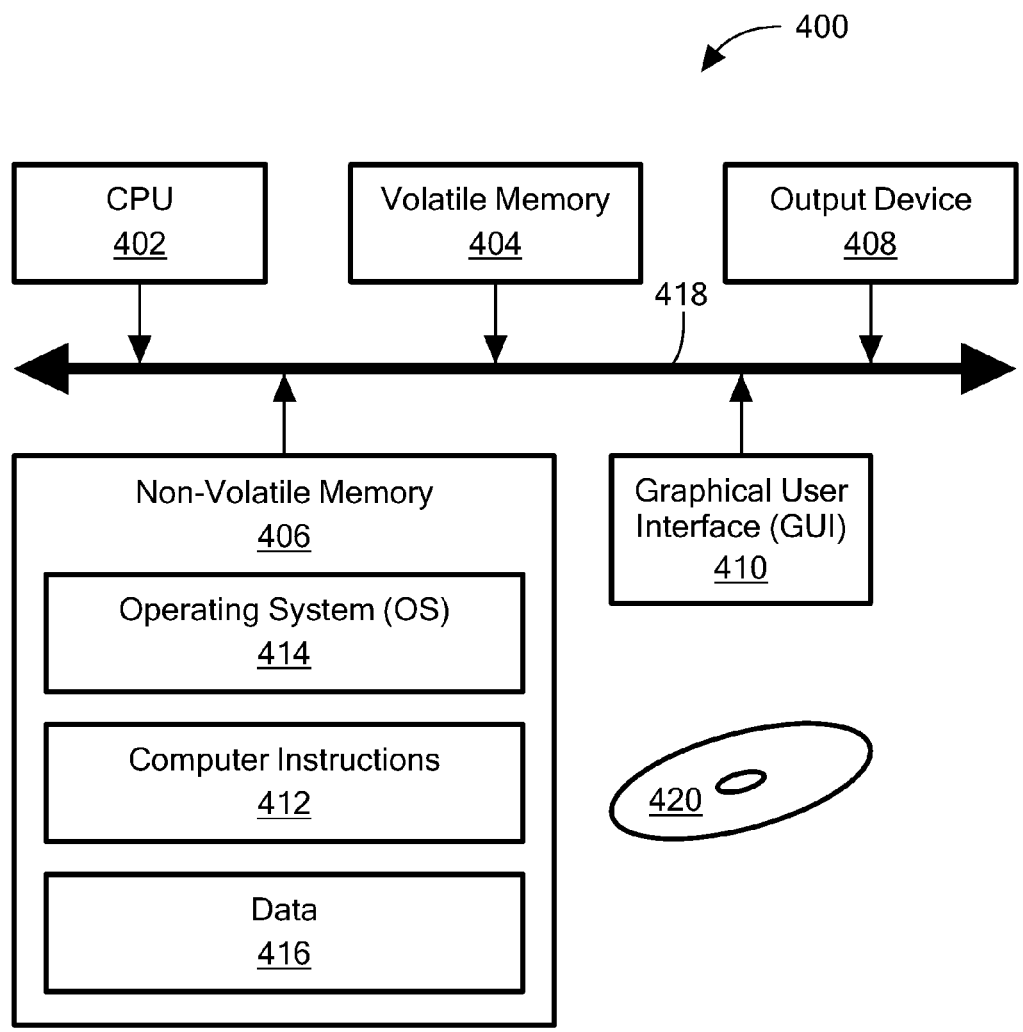
FIG. 4 is a schematic representation of an illustrative processing device for use with the systems and processes of FIGS. 1-3.

FIG. 4 shows an illustrative computer or other processing device 400 that can perform at least part of the processing described herein. In some embodiments, one or more components of the processing device 400 are provided within an RF receive system (e.g., receive system 100 of FIG. 1). The illustrative computer 400 may include a processor 402, a volatile memory 404, a non-volatile memory 406 (e.g., hard disk), an output device 408, and/or a graphical user interface (GUI) 410 (e.g., a mouse, a keyboard, a display, for example), each of which is coupled together by a bus 418. The non-volatile memory 406 stores computer instructions 412, an operating system 414, and data 416. In one example, the computer instructions 412 are executed by the processor 402 out of volatile memory 404. In one embodiment, an article 420 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A radio frequency (RF) receiver system comprising:
   a clock;
   a receiver front end operable to receive an RF signal centered around a dwell frequency and to generate a corresponding baseband signal;
   a baseband signal processor configured to receive the baseband signal and to detect synchronization hops at a plurality of frequency offsets; and
   a controller configured to:
      determine a plurality of search windows, each search window associated with a time offset;
      determine a search start time;
      determine hop frequencies for one or more of the search windows using a current time reading from the clock, the associated search window time offsets, and a frequency hopping algorithm;
      select one or more search windows for which the corresponding hop frequencies fit within a receiver front end's instantaneous bandwidth;
      set the receiver front end dwell frequency based upon the hop frequencies corresponding to the selected search windows;
      configure the plurality of frequency effects within the baseband signal processor using the hop frequencies determined for the selected search windows; and
      if the baseband signal processor detects a synchronization hop at one of the configured frequency offsets, synchronize the clock using at least the time offset associated with the search window for which the detected synchronization hop was determined.

2. The system of claim 1 wherein the controller is configured to, if the baseband signal processor detects the synchronization hop at the one of the configured frequency offsets, synchronize the clock further using the search start time.

3. The system of claim 1 wherein the clock has a time uncertainty and the controller is configured to divide the time uncertainty into the plurality of search windows of equal duration.

4. The system of claim 3 wherein the search window duration is an integer multiple of a time between successive ones of the synchronization hops.

5. The system of claim 1 wherein the controller is configured to select a largest set of search windows for which the corresponding hop frequencies fit within the receiver front end's instantaneous bandwidth.

6. The system of claim 1 wherein the controller is further configured to verify the detected synchronization hops.

7. The system of claim 1 wherein the controller is further configured to set the receiver front end dwell frequency such that the receiver front end instantaneous bandwidth spans the hop frequencies corresponding to the selected search windows.

8. A method for use within a radio frequency (RF) receive system, the method comprising:
   (a) determining a plurality of search windows, each search window associated with a time offset;
   (b) determining a search start time;
   (c) determining hop frequencies for one or more of the search windows using the search start time, the associated search window time offsets, and a frequency hopping algorithm;
   (d) selecting one or more search windows for which the corresponding hop frequencies fit within the receive system's instantaneous bandwidth;
   (e) configuring the receive system to dwell upon the hop frequencies determined for the selected search windows and to detect synchronization hops at ones of the configured hop frequencies; and
   (f) if the receive system detects a synchronication hop at one of the configured hop frequencies, determining the time difference between the receive system and a transmit system using at least the time offset associated with the search window for which the one of the configured hop frequencies was determined.

9. The method of claim 8 further comprising:
   (g) if the baseband signal processor detects no synchronization hop at the one of the configured hop frequencies, assigning the search window for which the one of the configured hop frequencies was determined to have a closed status,
   wherein steps (d)-(g) are repeated at least once.

10. The method of claim 8 wherein determining the plurality of search windows comprises dividing a time uncertainty into the plurality of search windows of equal duration wherein the time uncertainty is associated with a clock within the receive system.

11. The method of claim 10 wherein the total of the search window durations is at least equal to the time uncertainty.

12. The method of claim 8 wherein selecting one or more search windows for which the corresponding hop frequencies fit within the receive system's instantaneous bandwidth comprises selecting the largest set of search windows for which the corresponding hop frequencies fit within the receive system's instantaneous bandwidth.

13. The method of claim 8 further comprising verifying the detected synchronization hops.

\* \* \* \* \*